Figure 1:
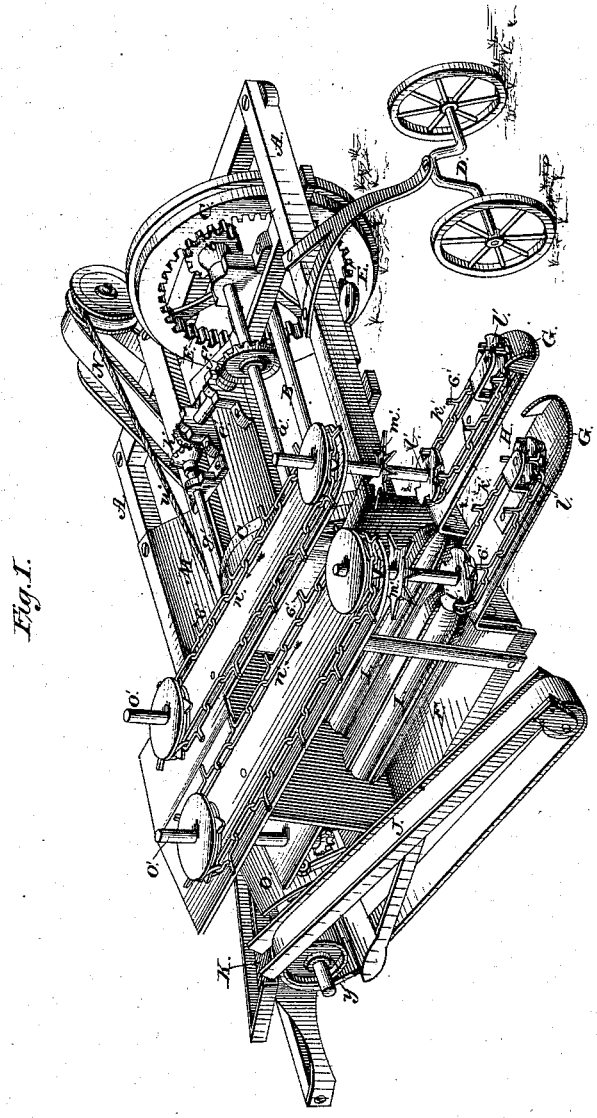

J. H. McNALL.
CORN-HARVESTERS.

No. 194,046.

2 Sheets—Sheet 1.

Patented Aug. 14, 1877.

Attest:
J. B. Geyser.
Fred. Mayer

Inventor:
James H. McNall.

2 Sheets—Sheet 2.
J. H. McNALL.
CORN-HARVESTERS.
No. 194,046. Patented Aug. 14, 1877.
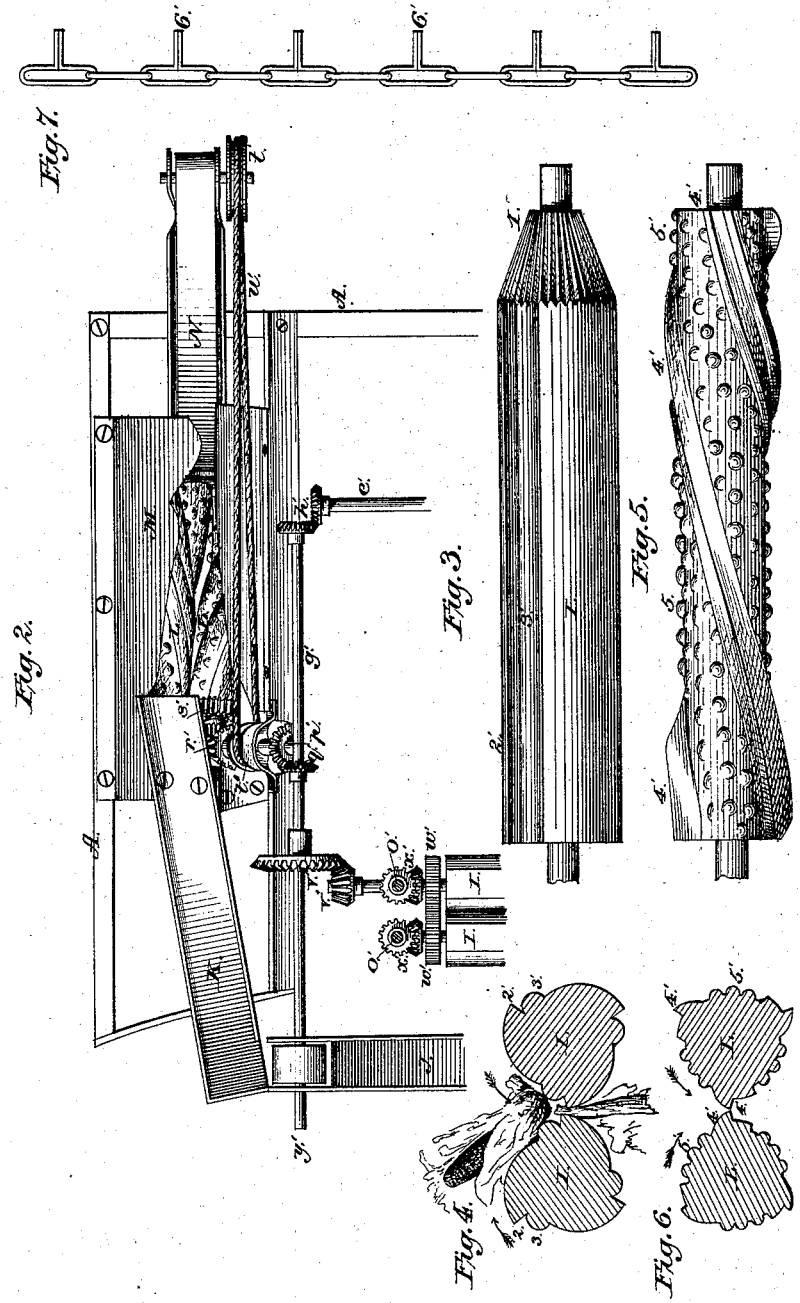

UNITED STATES PATENT OFFICE.

JAMES H. McNALL, OF FINLEY TOWNSHIP, ALLEGHENY COUNTY, PA.

IMPROVEMENT IN CORN-HARVESTERS.

Specification forming part of Letters Patent No. 194,046, dated August 14, 1877; application filed September 29, 1876.

*To all whom it may concern:*

Be it known that I, JAMES H. MCNALL, of Finley Township, in the county of Allegheny and State of Pennsylvania, have invented certain new and useful Improvements in Field Corn Snappers, Huskers, and Gatherers, which improvements are fully set forth in the following specification, reference being had to the accompanying drawings.

My invention consists of an improved form of roller for husking and breaking off the ears of corn from the stalks, and a new combination of devices for raising the fallen stalks and carrying them, together with the standing stalks, between and along the rollers.

The objects of my invention are to feed the stalks of corn evenly to the rollers, and thus prevent them from becoming clogged by too full a feed; to bruise the stalk as little as possible; to press the ear out of the husk without shelling off grains of corn; and to raise the fallen stalks and carry them to the husking-rollers.

In the drawings, Plate 1 is an isometrical perspective view of my machine.

Like letters of reference refer to like parts.

As the use of the different parts will be better understood by combining in their description that of the operation of the machine, I will proceed to do so.

The frame of the machine A A is formed of wood suitably joined together. To it all the working parts are attached, in such a manner that their weight about evenly balances the whole upon the pivots of the main axle B, to which are firmly fixed the motor-wheels C C, from which all the working parts derive their motion.

The forward part of the machine can be supported by any suitable running-gear, in the present case represented by the truck D, said gear to be attached in any manner found most convenient.

The wheels C C, by their internal gear E E, communicate motion to the shaft $a'$ by means of the pinions $b'\ b'$. The angle-shaft $e'$, driven by the bevel-gear $f'$, conveys the motion to the counter-shaft $g'$ by the miter-gear $h'$. From this counter-shaft all the connections to the working parts are made.

I I are the snapping or squeezing rollers. The inner roller has motion from the shaft $g'$ by means of bevel-gear, and both rollers have spur-pinions meshing into each other.

As the machine is drawn forward the stalks enter the space H, and lodged or fallen stalks are caught by the vertical prongs of the chains $k'\ k'$, which revolve with the chain-pulleys $l'\ l'\ l'\ l'$, the chain sliding on the upper surface of the arms G G. These chains carry the lodged or fallen stalks to the spiked wheels $m'\ m'$, which guide and thrust both the lodged and standing stalks of corn into the jaws of the snapping-rollers. They are assisted in doing so by the driving-chains $n'\ n'$ with their horizontal prongs, which slide on the hood of the snapping-frame, the line of their motion being indicated by the arrows. (The same sign is used to indicate the motion of other parts.) All the chain-work and parts connected therewith derive their motion from the shafts O′ O′, connected by miter-gear to the rear end of the snapping-rollers I I. These rollers have gimlet-pointed heads and longitudinal serrations, (more fully described further on,) whose duty is to seize the stalks and cause them to pass downward through the space between them. The ears of corn, being always larger in diameter than the stalk, cannot pass, and remain on the surface of the rolls until they drop into one of the serrations mentioned, the opposing edges of which, as they close on the husk at the butt of the ear, force the ear out of the husk. As the inner roller is placed higher than the outer, the ear flies toward and upon the elevator J. The husk remains upon the stalk and is passed with it under the machine.

In Fig. 2, Plate 2, I have shown a plan by which the mode of communicating power to the different parts will be more fully understood. $e'$ is the angle-shaft conveying motion from the main shaft to the counter-shaft $g'$ by means of the miter-gear $h'$. The angle-shaft $p'$ has motion by the miter-gear $q'$ from $g'$, and conveys it to the cleaning or husking rolls L L by the miter-gear $r'$. The spur-pinions $s'\ s'$ unite L L. $p'$ also, by means of the sheaves $t'\ t'$ and the belt $u'$, drives the elevator N. $g'$, by means of the bevel-gears $v'\ v'$, gives motion to the snapping-rolls I I, united by the spur-pinions $w'\ w'$, and these, by the miter-gear $x'$ $x'$, drive the vertical shafts $O'$ $O'$, by which the chain mechanism of the snapping-frame derives motion. The elevator J is directly attached to $g'$ at $y'$.

In Fig. 3, Plate 2, I have shown an enlarged view of the snapping-roller I. The point is tapered or gimlet-shaped, so as to seize the stalk and force it into the narrow space between the body of the rolls. This point is shown at 1.

The section at Fig. 4 shows the relative position of the parts of the longitudinal serrations, and the ear being broken off by the snapping-edges 2 2' and squeezing or throwing ridges 3 3'.

The sheaves upon which the chains turn have the necessary teeth to fit into the links, and are provided with proper guards, those on the arms G G to keep the prong 6' in a vertical position, and those on the hood of the snapping-frame to keep the prong in a horizontal position. Aside from this, however, it is my intention to use properly-shaped grooved channels or gutters, to keep the chains in place and to their work.

I claim as my invention—

1. The snapping or squeezing rollers I I, with gimlet-points 1, snapping or breaking edges 2 2', squeezing-ridges 3 3', substantially as and for the purposes described.

2. The combination of the chains $k'$ $k'$, having vertical prongs, pronged wheels $m'$ $m'$, chains $n'$ $n'$, having horizontal prongs, and rollers I I, substantially as and for the purposes described.

JAMES H. McNALL.

Witnesses:
JOHN B. GEYSER,
C. E. MILLIKEN.